No. 749,990. PATENTED JAN. 19, 1904.
E. F. HOLINGER.
VALVE.
APPLICATION FILED SEPT. 25, 1903.
NO MODEL. 2 SHEETS—SHEET 1.

WITNESSES.
J. R. Keller
Robt C Totten

INVENTOR.
Emil Fredrik Holinger
By Kay Totten & Winter
Attorneys

No. 749,990.                                                        Patented January 19, 1904.

UNITED STATES PATENT OFFICE.

EMIL FREDRIK HOLINGER, OF McKEESPORT, PENNSYLVANIA.

VALVE.

SPECIFICATION forming part of Letters Patent No. 749,990, dated January 19, 1904.

Application filed September 25, 1903. Serial No. 174,586. (No model.)

*To all whom it may concern:*

Be it known that I, EMIL FREDRIK HOLINGER, a resident of McKeesport, in the county of Allegheny and State of Pennsylvania, have invented a new and useful Improvement in Valves; and I do hereby declare the following to be a full, clear, and exact description thereof.

My invention relates to valves, and more especially to valves used in high-pressure mains.

The object of my invention is to provide a valve of this character which is so constructed that it can be easily opened and closed, no matter what the pressure in the main or pipe may be.

Great difficulty has heretofore been experienced with valves in high-pressure steam, water, and other fluid pipes or mains, the principal difficulty being that the pressure of the fluid on the movable member of the valve has been so great that it has been exceedingly difficult to open and close the valve. Furthermore, this excessive pressure has caused a large amount of wear in the parts.

The object of my invention is to provide a valve for the purpose above described which can be very easily opened and closed and which also is not subject to excessive wear.

To this end the invention consists, generally stated, in having the connecting openings or ports of the movable member extending entirely through the same with the openings in the two faces of substantially the same area and providing a suitable backing plate or member which serves to close these openings or ports on one side and also to take the pressure, thus relieving the movable member entirely of pressure, so that it moves practically without pressure, and hence very easily.

Figure 1:
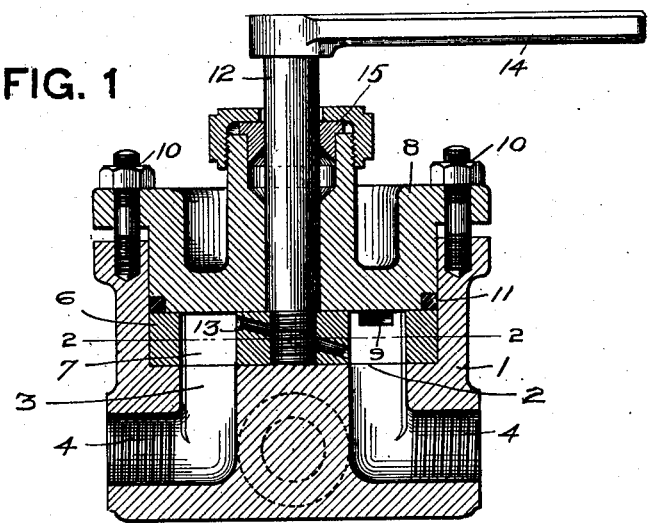
Figure 2:
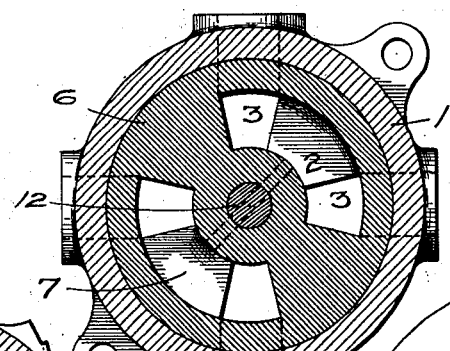
Figure 3:
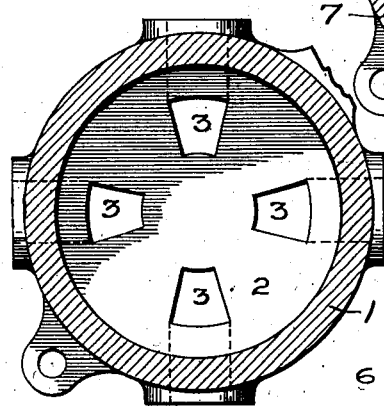
Figure 4:
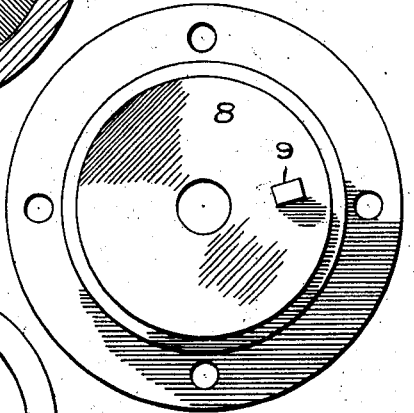
Figure 5:
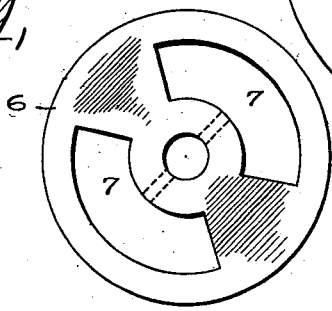
Figure 7:
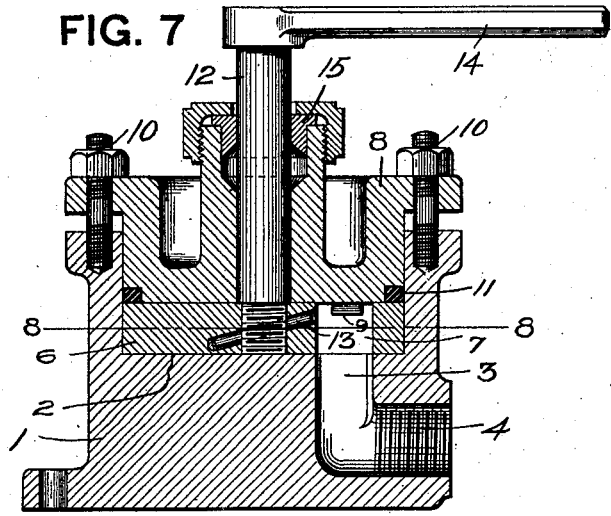
Figure 8:
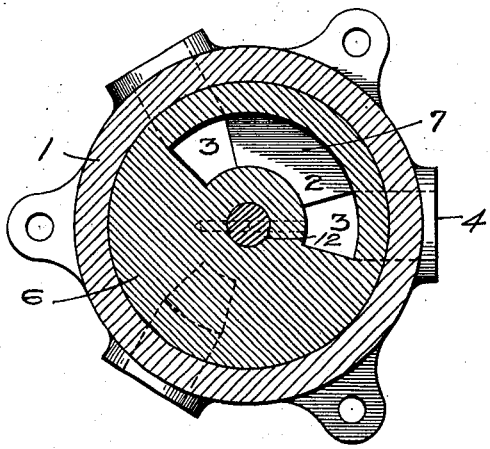
Figure 6:
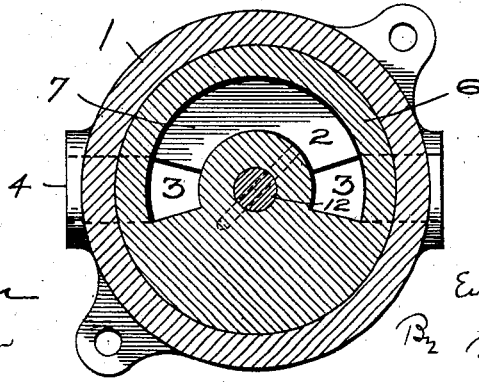

In the accompanying drawings, Figure 1 is a vertical section through a four-way valve constructed according to my invention. Fig. 2 is a horizontal section of the same on the line 2 2, Fig. 1. Fig. 3 is a similar section with the rotatable disk removed. Fig. 4 is a bottom plan view of the backing-plate. Fig. 5 is a plan view of the rotatable disk. Fig. 6 is a view similar to Fig. 2, but showing a two-way valve. Fig. 7 is a vertical section through a three-way valve constructed according to my invention; and Fig. 8 is a horizontal section on the line 8 8, Fig. 7.

My improvements may be embodied either in a two, three, or four way valve.

The valve comprises a suitable body or casing 1, which is provided with the flat seat 2. Through this seat are the inlet and outlet openings or ports 3, the number and location thereof depending upon the character of the valve. For instance, in Figs. 1 to 5 four such ports are shown, in Fig. 6 two such ports are shown, and in Fig. 8 three such ports are shown. Each of these openings or ports connects with a suitable opening or port 4, to which the mains or pipes are connected in the well-understood manner.

The movable member of the valve comprises a rotatable disk 6, which has flat top and bottom faces and which is provided with the openings 7 for connecting the various ports 3 in the well-understood manner. The number and size of these openings will depend upon the character of the valve, two such openings being used with a four-way valve and only a single opening with a two and three way valve. The peculiarity of these openings, however, in my invention consists in the fact that they extend entirely through the disk 6, as clearly shown in the drawings, whereas in ordinary valves these connecting means are nothing but passages formed in the lower face of the disk, leaving a wall of metal above the same. To take the place of the wall of metal and to close the top of these openings 7, I provide a suitable backing-plate, which may be of any desired form, fitting down in the casing and in close contact with the upper face of the valve. This backing-plate is shown as a casting 8, which forms the cap of the valve-casing and which has a flat lower face bearing against the upper face of the disk 6. A stud 9 is formed on the lower face of this backing-plate and projecting into one of the openings 7 in order to limit the throw of the disk. This backing-plate will be secured to the valve-body by any suitable means, preferably by means of nuts and bolts 10, as shown, so as to adjust the plate in order to take up wear. A suitable packing 11 is placed between the casing and plate 8 to prevent leakage. The valve-disk 6 is rotated by means of a stem 12, secured thereto by any convenient means, such as the cross-pin 13. This stem passes a central opening in the backing-plate 8 and is provided at its upper end with a handle 14 or other means for operating the same. A stuffing-box 15 is provided around this stem.

All forms of the valve shown in the drawings are constructed on exactly the same principle, the only difference in these valves being that with a four-way valve there are four openings 3 in the seat and two openings 7 in the disk. With the two-way valve there are only two openings 3 in the seat and a single opening 7 through the disk, and with the three-way valve there is only a single opening 7 in the disk and three openings 3 in the valve-seat. The number and position of the openings 3 in the seat and also the size, position, and number of the openings 7 in the disk can be varied to suit any requirement or the convenience of the user.

Inasmuch as the openings 7 extend entirely through the disk 6 and are of the same area on both faces of the disk the fluid-pressure will be exerted entirely against the backing-plate 8. Hence the disk is practically free from pressure and is, in effect, a floating disk, lying between the valve-seat and the backing-plate. This disk can be freely rotated no matter what the pressure of the fluid in the main may be, and, in fact, it will operate just as easily on very high pressures as on low pressures. By reason of this lack of pressure on the disk there is practically no wear, so that the life of the valve is greatly increased and repairs are less frequently necessary than with prior valves.

What I claim is—

1. In a valve, the combination of a body or casing provided with a seat having a plurality of openings or ports, a rotatable disk on said seat and provided with an opening or openings extending entirely through the same and coöperating with the ports in the valve-seat, and a backing-plate bearing against the face of said disk on the side opposite the valve-seat and arranged to close the opening or openings in said disk.

2. In a valve, the combination of a valve body or casing provided with a seat having a plurality of ports or openings, a rotatable disk on said seat and provided with an opening or openings and extending entirely through the same and coöperating with the ports in the valve-seat, a backing-plate bearing against the face of said disk on the side opposite the valve-seat, and arranged to close the opening or openings in said disk, and means for adjusting said backing-plate toward and from said disk.

3. In a valve, the combination of a body or casing provided with a seat having a plurality of ports or openings, a rotatable disk on said seat and with an opening or openings extending entirely through the same and coöperating with the ports in the valve-seat, and arranged to close the opening or openings in said disk, a backing-plate bearing against said disk on the face opposite the valve-seat, and an operating-stem connected to said disk and extending through said backing-plate.

4. In a valve, the combination of a body or casing provided with a seat having a plurality of openings or ports, a rotatable disk on said seat and provided with an arc-shaped opening or openings extending entirely through the same and coöperating with the ports in the valve-seat, a backing-plate bearing against said disk on the face opposite the valve-seat and arranged to close the opening or openings in said disk, and a lug on said backing-plate projecting into an opening in the disk for limiting the throw of the latter.

5. In a four-way valve, the combination of a casing or body provided with a seat having four ports or openings, a rotatable disk bearing against said seat and provided with two arc-shaped openings extending entirely through the same and arranged to coöperate with the ports in the valve-seat, and a backing-plate bearing against the face of said disk on the side opposite the seat and arranged to close the opening or openings in said disk.

6. In a valve, the combination of a body or casing provided with a valve-seat having a plurality of ports or openings, a rotatable disk on said seat and provided with an opening or openings extending entirely through the same and arranged to coöperate with the ports in the valve-seat, a backing-plate bearing against the face of said disk and arranged to close the opening or openings into said disk, on the side opposite the valve-seat, and threaded connecting means for securing said backing-plate to the valve-body and adjusting the same toward the rotatable disk.

In testimony whereof I, the said EMIL F. HOLINGER, have hereunto set my hand.

EMIL FREDRIK HOLINGER.

Witnesses:
W. B. FELL,
ROBERT C. TOTTEN.